UNITED STATES PATENT OFFICE.

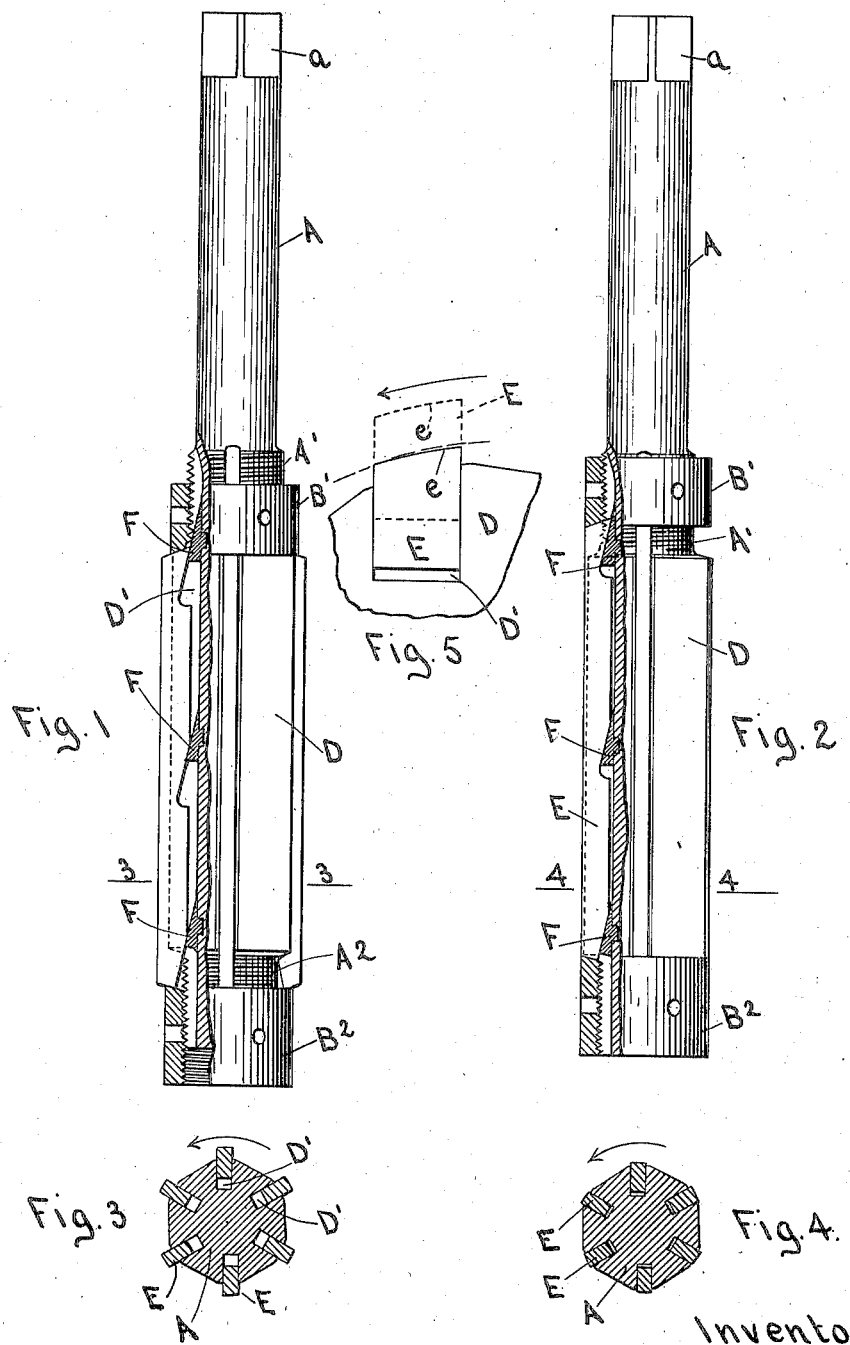

ALBERT A. MARTELL, OF MANSFIELD, MASSACHUSETTS, ASSIGNOR TO THE TAFT-PEIRCE MANUFACTURING COMPANY, OF WOONSOCKET, RHODE ISLAND, A CORPORATION OF RHODE ISLAND.

EXPANSIBLE TOOL AND METHOD OF GRINDING THE BLADES THEREOF.

1,321,838.      Specification of Letters Patent.      Patented Nov. 18, 1919.

Application filed July 19, 1915. Serial No. 40,580.

*To all whom it may concern:*

Be it known that I, ALBERT A. MARTELL, of Mansfield, in the county of Bristol and State of Massachusetts, have invented a new and useful Expansible Tool and Method of Grinding the Blades Thereof, of which the following is a specification.

My invention relates to expansible tools and consists primarily in providing offset grooves for the cutting blades and in the preferred form I grind the blades when in their outermost positions on the tool itself.

In the drawings,

Figure 1 is an elevation partly in section of a tool embodying my invention with the blades in their outermost position;

Fig. 2 is an elevation partly in section showing the blades approximately in their innermost position;

Fig. 3 is a section on line 3—3 of Fig. 1;

Fig. 4 is a section on line 4—4 of Fig. 2; and

Fig. 5 is an enlarged detail showing different positions of one of the blades.

A represents the shank of a reamer, said shank having threaded portions A' and A² to engage respectively clamping nuts B' and B². The shank is also provided with enlarged portion D which has offset grooves D' to receive blades E E which ride along wedges F F which are fixed to the shank during operation but removable transversely therefrom. The clamping nuts hold the blades in adjusted position. The end $a$ of the shank is made polygonal to be engaged by an actuating element.

It will be observed that in Figs. 1 and 3 and in dotted lines in Fig. 5 the blade E is shown in its outermost position and when in this position I rotate the shank so that a grinder engages the outer surface $e$ of the blade and makes said surface cylindrical, the axis being the axis of said shank.

When the blade is adjusted toward the shank it moves inwardly in its groove which is offset with relation to the center of said shank so that the advance or cutting edge of surface $e$, when the tool is rotated in the direction indicated by the arrow, is further from the center of the shank than any other portion of surface $e$ and the clearance increases as the blade is moved inwardly.

I prefer the method of grinding above described in which the blades are ground when rotated by the expansible tool itself but the blades might be ground while mounted on a separate rotating member and then inserted in the grooves of said shank, which grooves are offset in the direction of rotation.

By the term offset I mean to include all forms in which the central plane of the groove does not pass through the axis of the shank.

What I claim is:

1. The process of providing clearance for the blade of an expansible tool consisting in cylindrically grinding the outer surface of the blade while it is held in a groove in said tool in approximately one of its extreme positions radially of said tool and then moving said blade radially of the tool and holding it in this latter position.

2. The process of providing clearance for the blade of an expansible tool consisting in rotating the shank of the tool while the blade is held in an offset groove in said shank in approximately its outermost position, the outer surface of the blade being ground cylindrically during said rotation, and then moving said blade inwardly in said groove and holding it in this latter position.

3. The method of providing clearance on the blades of an expansible reamer, which method comprises the adjustment of the blades in a suitable holder to a position beyond the capacity of the tool in one dimension; then rotating the tool and grinding the blades to a common cylindrical surface; then adjusting the blades in a straight line so that the cutting edges are a greater distance from the axis of the tool than in any other part of the curved portion of the face.

4. In a device of the character described a shank provided with an offset groove so positioned that the mid plane of said groove does not include the axis of said shank, a blade mounted in said groove, and means to adjust said blade whereby the cutting edge of said blade may be set at predetermined distances from the axis of said shank, the cutting edge of said blade being formed of an obtuse angle of metal.

5. A device of the character described comprising in combination a shank provided with an offset groove whereby the mid plane of said groove does not intersect the axis of said shank, a blade seated in said groove, the outer surface of said blade comprising a portion of a cylindrical surface, said blade being provided with a front surface intersecting said cylindrical surface to form a cutting edge, and means to adjust said blade whereby the cutting edge is adjusted toward or from the axis of said shank, the axis of said cylindrical surface being the axis of said shank when said blade is adjusted to approximately one of the extreme positions releative to the axis of said shank.

6. A device of the character described comprising in combination, a shank provided with a plurality of offset grooves, a blade mounted in each groove and having an outer surface comprising a portion of a cylindrical surface, said blades being provided with front surfaces intersecting said cylindrical surfaces to form edges, and means to adjust said edges toward or from the axis of said shank, the axis of said cylindrical surfaces being the axis of said shank when the blades are approximately at their outermost adjusted positions.

7. In a device of the character described comprising a shank provided with a groove, the middle internal plane of said groove passing in front of the axis of said shank relative to the direction of rotation of the shank, a blade mounted for movement in said groove, the outer surface of said blade comprising a portion of a cylindrical surface, and means to adjust said blade to move said cylindrical surface toward or from the axis of said shank.

8. As an article of manufacture a reamer blade having a cutting edge formed by the intersection of a plane surface and a cylindrical surface, the angle between said plane surface and the tangent to said cylindrical surface at the point of intersection being an obtuse angle.

9. As an article of manufacture a reamer blade having a pair of parallel plane surface sides, a portion of a cylindrical surface intersecting said plane surface sides and forming a cutting edge with one of said sides, said cutting edge being so formed that the angle of the cutting edge measured between said plane side surface and a tangent to the cylindrical surface at the point of intersection is an obtuse angle.

10. The method of grinding reamer blades and the like, which comprises mounting the blades in a suitable holder in such manner that the midplanes of the blades do not intersect the axis of the holder; adjusting the blades in the holder in such manner that a radius to the cutting edge of a blade is longer than the maximum radius to the same edge when the blade is in use; and then rotating the holder and grinding the outer surfaces of the blades in such manner that the said surfaces comprise a portion of a common cylindrical surface.

11. The method of grinding reamer blades and the like which comprises mounting the blades in a suitable holder with the outer surfaces of the blades extended from the axis of the holder a distance greater than the radius which the blades are adapted to cut and with the cutting blades offset radially in such manner that the planes forming the front faces of the blades do not include the axis of the holder; then grinding the outer surfaces of the blades to lie in a common cylindrical surface; and then adjusting the blades inwardly to provide clearance back of the cutting edges of the blades.

12. The method of grinding reamer blades and the like which comprises mounting the blades in a suitable shank in such manner that the blades stand eccentric relative to the axis of the shank; then adjusting the blades outwardly beyond the capacity of the reamer; then rotating the shank and grinding the blades to a common cylindrical surface, and then adjusting the blades inwardly whereby clearance is provided for the cutting edges.

13. The method of grinding reamer blades and the like which comprises mounting the blades in a suitable shank in such manner that the front faces of the blades stand eccentric relative to the axis of the shank; then adjusting the blades outwardly beyond the capacity of the reamer; then rotating the shank and shaping the blades to a common cylindrical surface, and then adjusting the blades inwardly whereby clearance is provided for the cutting edges.

ALBERT A. MARTELL.